United States Patent [19]

Gliemeroth

[11] 4,038,090

[45] July 26, 1977

[54] ION EXCHANGEABLE GLASS HAVING LOW THERMAL EXPANSION

[75] Inventor: Georg Gliemeroth, Finthen, Germany

[73] Assignee: Jenaer Glaswerk Schott & Gen., Mainz, Germany

[21] Appl. No.: 636,843

[22] Filed: Dec. 2, 1975

[30] Foreign Application Priority Data

Dec. 2, 1974 Germany .............................. 2456894

[51] Int. Cl.$^2$ .......................... C03C 3/10; C03C 21/00
[52] U.S. Cl. ........................................ 106/53; 106/54; 106/47 Q
[58] Field of Search .................. 106/47 Q, 53, 54; 65/30 E

[56] References Cited

U.S. PATENT DOCUMENTS

| | | | |
|---|---|---|---|
| 3,486,808 | 12/1969 | Hamblen | 65/30 E |
| 3,533,888 | 10/1970 | Eppler et al. | 65/30 E |
| 3,898,093 | 8/1975 | Faulstich et al. | 106/54 |
| 3,954,487 | 5/1976 | Gliemeroth et al. | 106/54 |

*Primary Examiner*—Winston A. Douglas
*Assistant Examiner*—Mark Bell
*Attorney, Agent, or Firm*—Millen & White

[57] ABSTRACT

For producing gradient refractive index optical components having substantially no internal stress, there is provided for the ion exchange step glass of the following composition

| | | | |
|---|---|---|---|
| $SiO_2$ | 47 – 61 | CaO | 0 – 5 |
| $Al_2O_3$ | 13 – 20 | $Li_2O$ | 3 – 10 |
| $La_2O_3$ | 1 – 8 | $Na_2O$ | 6 – 16 |
| $Ta_2O_5$ | 0 – 7.5 | $K_2O$ | 0 – 6 |
| $ZrO_2$ | 0 – 4 | PbO | 0.5 – 15 |
| $WO_3$ | 0 – 3 | $TiO_2$ | 0 – 4 |
| BaO | 0 – 5 | $P_2O_5$ | 0 – 3 |
| ZnO | 0 – 5 | $B_2O_3$ | 0 – 5 |
| MgO | 0 – 5 | | Fining Agent. |

21 Claims, No Drawings

ION EXCHANGEABLE GLASS HAVING LOW THERMAL EXPANSION

BACKGROUND OF THE INVENTION

This invention relates to an inorganic vitreous material suitable for ion exchange, and ion exchanged products produced thereby, wherein the refractive index is changed considerably, but wherein the linear thermal expansion coefficient is not altered significantly, if at all. The glass according to this invention can be utilized as a material for gradient rods, gradient lenses, fiber optics with refractive index gradients, and other optical systems utilizing glass having refractive index gradients.

It is known that changes in concentration can be caused in glasses by altering the composition of the melt, as well as by ion exchange. Changes in properties attained thereby can generally be determined by calculations. However, this invention could not result from mere calculations.

Ion exchange processes between glass and suitable media, e.g. salt solutions, salt melts, suspensions, or solid layers applied in any desired way, are conventional. On the basis of extensively investigated diffusion processes, an exchange takes place between readily diffusing ions of the glass and those of a suitable medium. This process is, in most cases, greatly dependent on the temperature.

These ion exchange processes are frequently utilized to change the characteristics of the glass. The best-known example is the increase in strength by means of ion exchange taking place in various ways at below and above the relaxation temperature. While at lower temperatures (below a temperature corrresponding to a glass viscosity of $10^{14.5}$ poises) small ions of the glass are exchanged for larger ions from the suitable medium, thus resulting in a buildup of internal pressure in the zone affected by the ion exchange, the glass composition is altered, at higher temperatures, by the ion exchange so that the composition obtains a lower linear thermal expansion coefficient. Thus, both processes lead to the buildup of compressive stresses in the exchanged zone. A summary of these methods can be found in H. Schröder and G. Gliemeroth ("Festigkeitserhoehung von Glaesern durch Oberflaechenbehandlung" [Increasing the Strength of Glasses by Surface Treatment], "Naturwissenschaften" [Natural Sciences] 57 [1970]).

In general, the most readily diffusing ions of Li, Na, K, Rb, Cs, Tl are utilized as the diffusing ions, but considerations and experiments have already been conducted on the use of ions of Pb, Ba, Cd, Sr, Ca, Zn, Mg, Be for changing characteristics by ion exchange.

Just as the linear thermal expansion coefficient can be altered, it is also possible to change other properties of the glass in the zone subjected to the ion exchange. One possibility is the alteration of the refractive index, which is utilized especially in the field of refractive index gradient generation.

In this method, the concentration profiles produced in the glass during the course of the ion exchange are utilized. For if ions of the glass are exchanged against ions lowering the refractive index of the glass, a refractive index profile is obtained after termination of the ion exchange which is proportional to the concentration profile of the ions migrated into the glass. In the present case, the refractive index thus becomes increasingly lower with a rising concentration of migrated ions. Several examples for utilizing these refractive index profiles produced by ion exchange can be found in U.S. Pat. No. 3,486,808, Hamblen; German Pat. No. 1,913,358, Kitano, Koizumi, Matsamura; German Pat. No. 1,933,124, Uschida, Furukawa, Yoshikawa, Kitano, Koizumi; U.S. Pat. No. 3,614,197, Nishizawa, Kawakami, Kiyasu; German Pat. No. 1,901,053, Gliemeroth and Jacobsen; and German Pat. No. 2,039,239, Gliemeroth and Jacobsen.

Also, the suggestion has been advanced to start, in the production of gradient-optical elements, with homogenous inorganic glasses and generate therein refractive index gradients by ion exchange which are responsible for the optical effect, e.g., beam deflection.

Thus, for example a refractive index gradient having the shape of a parabola is produced in a homogeneous glass rod having a thickness of 10 mm. and a length of 120 mm., composed of, in percent by weight: 64% $SiO_2$; 5% $Li_2O$; 17% $Al_2O_3$; 8% PbO; 6% $Na_2O$, by a treatment in a $NaNO_3$ salt bath for 164 hours at 495° C.; this refractive index gradient corresponds to a maximum refractive index difference from the inside toward the outside of $\Delta n = 85 \times 10^{-4}$. This gradient rod, actually very suitable for image transmission, suffers from the grave disadvantage of high internal stress due to the linear thermal expansion coefficient which has been partially altered by the ion exchange. The paramount handicap of such rods is the great danger of breakage caused by even minor shocks. Other refractive index gradient systems, such as gradient fibers, for example, effected by altering the concentration, also suffer from this phenomenon, even though the optically active concentration profile was not produced by ion exchange.

Numerous investigations are found in the literature disclosing how to calculate the change in characteristics caused by a change in concentration. A summary of various techniques for calculating the linear thermal expansion coefficient and for calculating the refractive index from the concentration of the ions constituting the glass is given by H. Scholze ("Glas; Natur, Struktur und Eigenschaften" [Glass; Nature, Structure, and Properties], Friedr. Vieweg und Sohn, Braunschweig 1965). There have been many experiments over the years in science and practice corroborating the validity of such calculations.

For purposes of illustration, several examples, not pertaining to the present invention, are set forth infra to demonstrate to which extent the properties of the refractive index and the linear thermal expansion coefficient are altered by changes in the concentration of ions to be exchanged and/or by the ion exchange. Table 1 shows, with reference to known compositions outside the scope of the invention, how the refractive index and the linear thermal expansion coefficient are changed by altering the glass melt composition. Primarily, the concentration of those components was changed which can also readily diffuse as ions.

The fact that similar changes in properties can be attained by a suitable ion exchange, corresponding to the changes in properties obtained by alterations in the melt composition, can be demonstrated with reference to the changes in characteristics indicated in Table 2, produced as compared to Table 1 on the same starting compositions, but by means of ion exchange. Compositions of Table 1 were employed.

Also, this fact is disclosed in the literature. When comparing Tables 1 and 2, it can be seen that it appears to make no difference, in principle, whether the change in the concentration and the resultant changes in properties take place by altering the glass melt composition or are evoked subsequently by ion exchange.

TABLE 1

Changes in Properties by Alteration of the Melt Composition Using Examples Not According to This Invention, in Percent by Weight

| Oxide | I A | I B | I C | II A | II B | III A | III B | IV A | IV B |
|---|---|---|---|---|---|---|---|---|---|
| $SiO_2$ | 57.67 | 54.61 | 57.67 | — | — | 19.80 | 19.80 | 60.00 | 60.00 |
| $B_2O_3$ | — | — | — | 50.00 | 50.00 | — | — | — | — |
| $Al_2O_3$ | 26.69 | 25.27 | 26.69 | 30.00 | 30.00 | — | — | — | — |
| PbO | — | — | — | — | — | 66.20 | 66.20 | 20.00 | 20.00 |
| $Tl_2O$ | — | — | — | — | — | 14.00 | 7.00 | 5.00 | 2.00 |
| $Na_2O$ | — | 10.24 | 15.00 | 20.00 | 10.00 | — | — | 15.00 | 10.00 |
| $K_2O$ | — | — | — | — | 10.00 | — | 7.00 | — | 8.00 |
| $Li_2O$ | 15.64 | 9.87 | 5.00 | — | — | — | — | — | — |
| Linear thermal expansion coefficient $\times 10^7/°C$ (°–300° C.) | 118.3 | 104.8 | 97.8 | 108.4 | 107.3 | 105.6 | 137.4 | 108.2 | 118.7 |
| Tg (° C.)* | 443 | 472 | 483 | 432 | 419 | 359 | 345 | 432 | 413 |
| Refractive index $n_d$ for the wavelength of 587.6 nm. | 1.5446 | 1.5327 | 1.5307 | 1.5002 | 1.4990 | 1.7484 | 1.7499 | 1.5512 | 1.5479 |

*Tg means transformation temperature according to DIN [German Industrial Standard] 52324.

TABLE 2

Changes in Properties by Ion Exchange Using Examples Not According to This Invention, in Percent by Weight

| Oxide | I D | II C | III C | IV C |
|---|---|---|---|---|
| $SiO_2$ | 57.67 | — | 19.80 | 60.00 |
| $B_2O_3$ | — | 50.00 | — | — |
| $Al_2O_3$ | 26.69 | 30.00 | — | — |
| PbO | — | — | 66.20 | 20.00 |
| $Tl_2O$ | — | — | 14.00 | 5.00 |
| $Na_2O$ | — | 20.00 | — | 15.00 |
| $K_2O$ | — | — | — | — |
| $Li_2O$ | 15.64 | — | — | — |
| Exchange in the medium | $NaNO_3$ Salt Bath | $KNO_3$ Salt Bath | $NaNO_3$ + $KNO_3$ Salt Bath | $KNO_3$ Salt Bath |
| Ion exchange temperature (*) | 470° C. | 445° C. | 375° C. | 450° C. |
| Exchange period (*) | 36 h. | 48 h. | 48 h. | 48 h. |
| As attained by ion exchange (*) $\Delta n \times 10^4$ | 35 | 11 | 15 | 30 |
| $\dfrac{\Delta\alpha \times 10^7}{°C.}$ | 18.2 | 1.0 | 28.4 | 9.9 |

(*) Ion exchange adapted to Tg (see Table 3). Δ n and Δα: see the description in the section "Measuring Methods."

Instead of the salt bath in Example IV C, it is also possible to utilize other media e.g., a solution containing K-ions at 80° C. and at an exchange time of 1273 h. The result is a $\Delta n \times 10^4 = 25$ and a $\Delta\alpha \times 10^7 = 10$. Compositions such as I A, for example, are moreover distinguished by a high tendency toward crystallization and thus can only be produced under technically difficult conditions.

The example of the composition I A in Table 1 is varied by the melts I B and I C with the aid of controlled changes of the mixture (Table 1) with respect to the properties of refractive index and linear thermal expansion in a direction attained on Example I D of Table 2 with the same composition as Example I A by means of ion exchange. Although an exact coincidence of the properties altered by a change in the melt composition and by means of ion exchange was not attained and was not expected, either, a comparison of the two tables demonstrates that the Examples I (according to Pearson, French, and Rawson: Appl.Phys.Letters 15 [1969]: 76) result in a glass which with a moderate change in the index of refraction has a great change in expansion. Examples II (U.S. Pat. No. 3,486,808) result in a glass which, though showing a minor change in expansion, also has a very small change in the refractive index. Examples III (German Pat. No. 1,933,124) result in a glass having a minor change in the index of refraction and a great change in the expansion; Examples IV (German Pat. No. 1,913,358) yield a glass having a moderate change in the refractive index and a marked change in expansion.

SUMMARY

In contrast to the examples of the prior art, it is an object of the present invention to provide an inorganic glass which, on the one hand, changes to a sufficiently great extent with regard to the refractive index by ion exchange, within the zone covered by the exchange, and, on the other hand, is altered insignificantly, if at all, with regard to the linear expansion coefficient by means of the same exchange, so that there is no adverse internal stress of the exchanged parts.

Another object of this invention is to provide a glass which can be melted and exchanged under normal technical conditions. This results in requirements to be met by the viscosity and crystallization of the homogeneous starting glass as well as the condition that the glass during the ion exchange does not crystallize due to the ambient temperatures and the changing concentrations of the vitrifying oxides.

In the practical application of the refractive index gradient systems, it was found that differences in the refractive index of $\Delta n = 20 \times 10^{-4}$ are of a certain interest, but that refractive index differences of $\Delta n \sim 100 \times 10^{-4}$ are actually indicated as favorable for many fields of application. For technical applications, a $\Delta n > 50 \times 10^{-4}$ is of interest. Accordingly, a further object is to provide a great change in the refractive index of about $\Delta n \times 10^4 > 50$, preferably $\sim 100 \times 10^{-4}$, and a small change in expansion of about $\Delta \alpha \times 10^7/°C. <5$. The aforesaid change in the coefficient of thermal expansion is based on experience derived from the production of multi-thickness ophthalmic lenses, where it is known that a tolerance between two melted glasses of $\pm 2.5 \times 10^{-7}/°C$. (change in length per unit length, based on 1° centigrade), i.e., a difference in expansion of $5 \times 10^{-7}/°C$., does not lead to appreciable differences and does not result in stress breakage.

A still further object of this invention is to provide a glass which, after a suitable ion exchange, permits a refractive index difference of $\Delta n \geqq 70 \times 10^{-4}$ and a difference in the linear thermal expansion coefficient of $\Delta \alpha <5 \times 10^{-7}/°C$. (20°–300° C.).

Still another object is to provide gradient ion exchanged optical elements from the glass of this invention.

Upon further study of the specification and appended claims, further objects and advantages of this invention will become apparent to those skilled in the art.

To attain these objects, a range of a composition has now been suprisingly found wherein the refractive index can be changed by ion exchange to the desired extent and the linear thermal expansion coefficient is affected insignificantly, it at all, by the ion exchange. The composition range of the glass is as follows, in percent by weight:

|  | Claimed Range | Preferred Range |
|---|---|---|
| $SiO_2$ | 47 – 61 | 48 – 58 |
| $Al_2O_3$ | 13 – 20 | 14 – 19 |
| $La_2O_3$ | 1 – 8 | 2 – 6 |
| $Ta_2O_5$ | 0 – 7.5 | 0 – 2 |
| $ZrO_2$ | 0 – 4 | 0.5 – 1.5 |
| $WO_3$ | 0 – 3 | 0 – 2 |
| $BaO$ | 0 – 5 | 0.4 – 5 |
| $ZnO$ | 0 – 5 | 0 – 0.5 |
| $MgO$ | 0 – 5 | 0 – 1.5 |
| $CaO$ | 0 – 5 | 0 – 5 |
| $Li_2O$ | 3 – 10 | 3.5 – 7 |
| $Na_2O$ | 6 – 16 | 10 – 15 |
| $K_2O$ | 0 – 6 | 0 – 2 |
| $PbO$ | 0.5 – 15 | 2 – 10 |
| $TiO_2$ | 0 – 4 | 0 – 0.5 |
| $P_2O_5$ | 0 – 3 | 0 – 0.5 |
| $B_2O_3$ | 0 – 5 | 0 – 2.5 |
|  | Fining Agent | Fining Agent |

DETAILED DISCUSSION

This "abnormal" behavior of the compositions in the indicated range is possibly due to the fact that there is a high concentration of $La_2O_3 + Al_2O_3$. This behavior, wherein due to a change in concentration the refractive index is varied, while the linear thermal expansion coefficient is not altered, also seems to be due, quite particularly, to the weight ratio of $Al_2O_3$ to $La_2O_3$ (3.5 to 8.8 : 1). These components, especially their combined presence in an elevated concentration in a glass, result in a bulky structure. Thus, exchanged ions take care of changing the molecular refraction and thus the refractive index, in accordance with their properties, but the structure of the glass network is affected only to a slight degree, especially, moreover, to a lower degree than proportionally to the change in the refractive index. Thereby, in spite of the clear change in composition, only a minor change of the linear thermal expansion coefficient is obtained.

Tables 3 and 4 compositions within the scope of the present invention.

The limits for the $SiO_2$ content range between 47 and 61% by weight, preferably between 48 and 58% by weight. Higher $SiO_2$ contents are difficult to melt, and lower $SiO_2$ contents show expansion characteristics which are less than ideal. The $Li_2O$ content is to range between 3 and 10% by weight, preferably between 3.5 and 7% by weight. This oxide, of great importance for many exchange processes, is highly important in conjunction with $Na_2O$ contents of between 6 and 16% by weight, preferably between 10 and 15% by weight for obtaining minor changes in expansion. In this connection, the $K_2O$ content should range between 0 and 6%, preferably between 0 and 2% by weight. As a result, the glass of this invention is to have an alkali oxide content of at least 8% by weight. The preferred alkali content is at least 13.5% by weight.

The PbO content should amount to at least 0.5% by weight. The $La_2O_3$ content is to be 1–8% by weight and preferably ranges between 2 and 6% by weight. An exchange of $Al_2O_3$ for $La_2O_3$ appears to be possible within certain limits, but the $Al_2O_3$ content is to be restricted to 13–20% by weight, preferably to 14–19% by weight.

The introduction of $B_2O_3$ is possible up to an amount of 5% by weight, but is not absolutely necessary and can be effected in those cases where the melting of the glass becomes difficult due to relatively high contents of $Al_2O_3$, $La_2O_3$, $Ta_2O_3$, $ZrO_2$, and $WO_3$; the $B_2O_3$ serves as a special melting aid. Similar considerations apply with respect to $P_2O_5$ which can be added in a quantity of up to 3% by weight and accelerates the conversion of the total mixture into a melt. Too high contents of $B_2O_3$, just as of $P_2O_5$ cause cloudiness in the glass.

$Ta_2O_5$, just as $ZrO_2$ and $WO_3$ serve as stabilizers for the glass composition and can be utilized within the following limits: $Ta_2O_5$ — 0–7.5% by weight, preferably 0–2% by weight; $ZrO_2$ — 0–4% by weight, preferably 0.5 – 1.5% by weight; $WO_3$— 0–3% by weight, preferably 0–2% by weight. These components serving for stabilizing the glass must not be used in higher concentrations, since otherwise a crystallization takes place too easily during the cooling of the glass composition. circular earths can be added to the glass mixture in an amount of up to 5% by weight. BaO, ZnO, MgO, and CaO can be added in quantities of between 0 and 5% by weight; the preferred ranges for BaO are between 0.4 and 5% by weight, for ZnO between 0 and 0.5% by weight, and for MgO and/or CaO between 0 and 5% by weight. $TiO_2$ can be admixed in amounts of between 0 and 4% by weight, depending on the composition. In case of high $ZrO_2$ contents (within the claimed range), the $TiO_2$ concentration, however, should not exceed 0–0.5% by weight. To fine the glass, $As_2O_3$ or other fining agents are added. The concentration of such agents is within the limits technologically preferred nowadays, namely between 0 and 2% by weight. A preferred fining agent in connection with the compositions of this invention set forth in Tables 3 and 4 is $As_2O_3$, but this compound can readily be replaced by $Sb_2O_3$ or a combination of these two fining agents.

Especially good results are attained if, with a minimum alkali content of 13.5% by weight, the ratio of $(K_2O + Na_2O)$ to $Li_2O$ ranges between 1.5 and 4.3 and/or if, with a minimum content of $Al_2O_3$ and $La_2O_3$ of 16% by weight, the ratio of $Al_2O_3$ to $La_2O_3$ is between 2 and 9.5, all ratios being weight ratios.

The addition of components other than those discussed herein to the starting composition seems to result, according to previous experiments, in the "normal" property changes to be expected.

The most favorable values for $\Delta n \times 10^4$ are obtained in the compositions listed in Table 5 which also are distinguished by a very small $\Delta \alpha$.

The following description will set forth measuring methods for determining properties pertinent to the present invention.

The measurement of the refractive index is carried out by means of the Abbe refractometer at a wavelength of 587.6 nm. To determine experimentally the refractive index difference $\Delta n$ attainable by ion exchange in a glass sample under convenient circumstances, the refractive index is determined in a homogeneous sample of the starting glass having the dimensions of $2 \times 4 \times 4$ mm.; the sample is then subjected to an exchange at 20 degrees above the temperature corresponding to the viscosity of $10^{14}$ poises of the glass for 48 hours in the exchange medium, in this case a salt melt. According to experience, the thin sample is then completely exchanged. Subsequently, the refractive index is once again determined and the difference $\Delta n$ is formed. Special attention must be given to the most substantial error source inherent in this method, namely inhomogeneity and/or schlieren content of the glass. The linear thermal expansion coefficient is determined by dilatometry. All indicated values relate to a temperature range of between 20° and 300° C. To determine the expansion difference $\Delta\alpha$ experimentally, obtained by ion exchange in a glass sample under convenient circumstances, a round rod having a length of 6 cm. and a diameter of 4 mm. is cut from the homogeneous starting glass, the ends of this rod being spherically rounded. The linear thermal expansion coefficient is measured on this rod by means of the dilatometer. The measuring accuracy of the dilatometer is $\pm 0.15 \times 10^{-7}$/°C. Subsequently, the rod is subjected to the same ion exchange conditions as the thin sample used for determining the refractive index difference.

A second dilatometer measurement, now conducted on the exchanged rod, and forming the difference with respect to the first measurement, results in the expansion difference $\Delta \alpha$ caused by the ion exchange.

Measurements of the viscosity and density on the glasses were conducted according to standardized methods of ASTM and DIN.

Data regarding the crystallization characteristics were obtained by means of a light microscope on glass samples which were heated respectively for 60 minutes at various temperatures. Thus, in most cases, it is possible to find a lower (*lcl*) and an upper (*ucl*) crystallization limit, and a crystallization maximum (Cmax) (all three magnitudes characterized as temperature), and a growth rate of the crystals. The process steps for producing the glass are conventional as seen from the following examples.

TABLE 3

= Content as in Preceding Example
— Not Included in Example
Data in % by Weight

| | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 57.14 | = | = | = | = | 54.14 | 51.14 | 48.14 | 55.14 | 53.14 | 57.14 | = | 48.14 |
| $Al_2O_3$ | 17.14 | = | 19.14 | 15.14 | 13.14 | = | = | = | = | = | = | = | 14.50 |
| $La_2O_3$ | 3.43 | = | 1.43 | 5.43 | 7.43 | = | = | = | = | = | = | = | = |
| $Ta_2O_5$ | — | — | — | — | — | — | — | — | — | — | — | — | 0.20 |
| $ZrO_2$ | 1.14 | = | = | = | = | = | = | = | = | = | = | = | = |
| BaO | 0.57 | = | = | = | = | = | = | = | = | = | = | = | 1.60 |
| ZnO | — | — | — | — | — | — | — | — | — | — | — | — | — |
| MgO | — | — | — | — | — | — | — | — | — | — | — | — | 0.20 |
| CaO | — | — | — | — | — | — | — | — | — | — | — | — | — |
| $Li_2O$ | 2.57 | 4.57 | 4.57 | = | = | = | = | = | = | = | = | = | 4.00 |
| $Na_2O$ | 14.57 | 12.57 | 12.57 | = | = | = | = | = | = | = | 9.57 | 6.57 | 10.66 |
| $K_2O$ | — | — | — | — | — | — | — | — | — | — | 3.00 | 6.00 | 0.20 |
| PbO | 3.43 | = | = | = | = | 6.43 | 9.43 | 12.43 | 3.43 | = | — | = | 15.00 |
| $TiO_2$ | — | — | — | — | — | — | — | — | — | — | — | — | 0.13 |
| $P_2O_5$ | — | — | — | — | — | — | — | — | — | — | — | — | 0.10 |
| $As_2O_3$ | 0.70 | = | = | = | = | = | = | = | = | = | = | = | = |
| $B_2O_3$ | — | — | — | — | — | — | — | — | 2.00 | 4.00 | — | — | — |
| $\alpha \times 10^7$ 20-300 | 97.9 | 99.8 | 96.9 | 100.0 | 101.4 | 100.6 | 103.8 | 105.8 | 98.6 | 95.2 | 98.4 | 95.4 | 114.7 |
| Tg (° C) | 498° | 481° | 484° | 481° | 474° | 454° | 448° | 438° | 450° | 471° | 485° | 487° | 436° |
| nd | 1.5298 | 1.5349 | 1.5319 | 1.5397 | 1.5438 | 1.5436 | 1.5518 | 1.5613 | 1.5368 | 1.5372 | 1.5272 | 1.5329 | 1.5738 |
| $\Delta \alpha \times 10^7$ | 3.7 | 4.8 | 2.6 | 4.8 | 3.9 | 2.5 | 1.4 | 2.5 | 1.3 | 2.8 | 3.9 | 4.3 | 4.8 |
| $\Delta n \times 10^4$ | 115 | 63 | 97 | 140 | 96 | 83 | 78 | 86 | 67 | 80 | 80 | 77 | 114 |

TABLE 4

= Content as in Preceding Example
—Not Included in Example
Data in % by Weight

| | 14 | 15 | 16 | 17 | 18 | 19 | 20 | 21 |
|---|---|---|---|---|---|---|---|---|
| $SiO_2$ | 57.14 | = | = | = | = | = | = | = |
| $Al_2O_3$ | 17.14 | 15.00 | 13.50 | 15.00 | 13.50 | 15.00 | 13.50 | 15.00 |
| $La_2O_3$ | 3.43 | 3.00 | 2.70 | 3.00 | 2.70 | 3.00 | 2.70 | 3.00 |
| $Ta_2O_5$ | — | — | — | — | — | — | — | — |
| $ZrO_2$ | 1.14 | = | = | = | = | = | = | = |
| BaO | 0.57 | 3.14 | 4.94 | — | — | — | — | — |
| ZnO | — | — | — | 3.14 | 4.94 | — | — | — |
| MgO | — | — | — | — | — | 3.14 | 4.94 | — |
| CaO | — | — | — | — | — | — | — | 3.14 |
| $Li_2O$ | 4.57 | = | = | = | = | = | = | = |
| $Na_2O$ | 12.57 | = | = | = | = | = | = | = |
| $K_2O$ | — | — | — | — | — | — | — | — |
| PbO | 3.43 | = | = | = | = | = | = | = |
| $TiO_2$ | — | — | — | — | — | — | — | — |
| $B_2O_3$ | — | — | — | — | — | — | — | — |
| $AsO_3$ | 0.70 | = | = | = | = | = | = | = |
| $WO_3$ | — | — | — | — | — | — | — | — |
| $P_2O_5$ | — | — | — | — | — | — | — | — |
| $\alpha \times 10^7$ 20-300 | 98.4 | 100.6 | 102.8 | 98.8 | 100.2 | 99.5 | 100.7 | 99.7 |

TABLE 4-continued

= Content as in Preceding Example
— Not Included in Example
Data in % by Weight

| | | | | | | | |
|---|---|---|---|---|---|---|---|
| Tg (° C) | 485° | 466° | 458° | 471° | 467° | 475° | 478° | 479° |
| nd | 1.5350 | 1.5383 | 1.5403 | 1.5388 | 1.5415 | 1.5385 | 1.5405 | 1.5418 |
| Δ × 10^7 | 4.3 | 4.8 | 1.4 | 4.1 | 3.4 | 3.1 | 2.1 | 4.6 |
| Δn × 10^4 | 85 | 61 | 75 | 55 | 98 | 57 | 92 | 122 |
| | 22 | 23 | 24 | 25 | 26 | 27 | 28 | |
| $SiO_2$ | = | = | = | = | = | 55.14 | 50.88 | |
| $Al_2O_3$ | 13.50 | 15.00 | 13.50 | 15.00 | 15.00 | 17.14 | 17.00 | |
| $La_2O_3$ | 2.70 | 3.00 | 2.70 | 3.00 | 3.00 | 3.43 | 1.20 | |
| $Ta_2O_5$ | — | 2.57 | 4.37 | — | — | — | 0.20 | |
| $ZrO_2$ | = | = | = | = | 3.71 | 1.14 | 0.30 | |
| BaO | — | 0.57 | = | = | = | = | 4.14 | |
| ZnO | — | — | — | — | — | — | 1.05 | |
| MgO | — | — | — | — | — | — | 0.61 | |
| CaO | 4.94 | — | — | — | — | — | 0.39 | |
| $Li_2O$ | = | = | = | = | = | = | 3.26 | |
| $Na_2O$ | = | = | = | = | = | = | 14.32 | |
| $K_2O$ | — | — | — | — | — | — | 2.54 | |
| PbO | = | = | = | = | = | = | 0.58 | |
| $TiO_2$ | — | — | — | — | — | — | 2.20 | |
| $B_2O_3$ | — | — | — | — | — | — | 0.52 | |
| $As_2O_3$ | = | = | = | = | = | = | 0.30 | |
| $WO_3$ | — | — | — | 2.57 | — | — | 0.18 | |
| $P_2O_5$ | — | — | — | — | — | 2.00 | 0.22 | |
| α × 10^7 20–300 | 102.0 | 98.4 | 99.0 | 100.2 | 98.0 | 98.9 | 104.3 | |
| Tg (° C) | 474° | 477° | 479° | 474° | 481° | 487° | 479° | |
| nd | 1.5461 | 1.5398 | 1.5429 | 1.5374 | 1.5422 | 1.5334 | 1.5428 | |
| Δ × 10^7 | 0.4 | 2.9 | 2.7 | 3.6 | 0.1 | 1.3 | 0.8 | |
| Δn × 10^4 | 104 | 53 | 96 | 69 | 70 | 72 | 118 | |

TABLE 5

| Ratio $\frac{Al_2O_3}{La_2O_3}$ | 4.99 | 5.00 | 4.00 | 4.88 | 5.45 | 5.50 | 5.00 |
|---|---|---|---|---|---|---|---|
| Component | 40 | 41 | 42 | 43 | 44 | 45 | 46 |
| $SiO_2$ | 56.19 | 53.81 | 56.53 | 51.11 | 54.36 | 57.20 | 56.94 |
| $Al_2O_3$ | 16.85 | 16.85 | 17.39 | 17.00 | 17.44 | 13.28 | 13.50 |
| $La_2O_3$ | 3.38 | 3.37 | 4.35 | 3.48 | 3.20 | 2.42 | 2.70 |
| $ZrO_2$ | 1.12 | 1.26 | 1.09 | 1.20 | 1.10 | 1.05 | 1.14 |
| BaO | 0.56 | 0.56 | 0.54 | 0.62 | 0.62 | 4.89 | 0.40 |
| $Li_2O$ | 4.49 | 4.49 | 4.35 | 4.60 | 4.58 | 4.53 | 4.57 |
| $Na_2O$ | 13.48 | 14.61 | 13.04 | 12.60 | 12.50 | 12.70 | 12.57 |
| PbO | 3.37 | 4.49 | 2.17 | 9.50 | 3.52 | 3.53 | 3.44 |
| $B_2O_3$ | — | — | — | — | 1.98 | — | — |
| CaO | — | — | — | — | — | — | 4.54 |
| $As_2O_3$ | 0.56 | 0.56 | 0.54 | 0.70 | 0.70 | 0.40 | 0.20 |
| Δn × 10^4 | 84 | 79 | 115 | 80 | 95 | 75 | 101 |
| Δα × 10^7 | 0.2 | 1.8 | 0.3 | 1.0 | 1.3 | 1.4 | 0.3 |
| Tg (° C) | 473 | 468 | 485 | 483 | 452 | 458 | 472 |
| Crystallization | Examples 40 through 46 do not show any crystallization in the viscosity range of between $10^1$ and $10^7$ p. | | | | | | |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight. (With reference to the examples, oxide compositions 40–46 appear in Table 5.)

EXAMPLE 1

The following mixture is calculated, weighted, and blended for the oxide composition 43:

| | |
|---|---|
| 5.63 kg. | purified sand |
| 2.58 kg. | aluminum trihydrate |
| 0.34 kg. | lanthanum oxide |
| 0.11 kg. | zirconium oxide |
| 0.017 kg. | barium nitrate |
| 0.059 kg. | barium carbonate |
| 1.122 kg. | lithium carbonate |
| 0.275 kg. | sodium nitrate |
| 2.144 kg. | soda |
| 0.345 kg. | minium |
| 0.056 kg. | arsenic oxide |

The blend is charged at 1490° C. into a 5-liter platinum crucible, melted at 1510° C. for 2 hours, homogenized by agitation, and cooled within 1 hour to 1370° C. The content of the crucible is then poured into metal molds which are cooled from 590° C. to room temperature at a rate of 7° C./hour. The thus-obtained glass is homogeneous and free of stresses. From these cast articles, rods are drilled by means of core drills, these rods having a length of 10 cm. and a diameter of 4 mm. The rods are circularr in cross section and are subsequently polished on the cylindrical outer surface. Subsequently, the rods are heated in an electric furnace with a heating rate of 15° C./hour to 400° C. Simultaneously, a salt bath consisting of 75% sodium nitrate and 25% sodium chloride is heated in another electric furnace to 505° C. The molten bath is contained in a metal vessel open at the top. At this point in time, the preheated glass rods at withdrawn from the preheating furnace and immersed in the salt melt. The rods are left therein for 84 hours at a constant temperature, then taken out of the salt bath, and immediately placed back into the preheating furnace. The latter is then cooled to room temperature at a rate of 7° C./hour. The glass rod, having a thickness of 4mm., is thereafter cut into slices of a thickness of 3mm. at right angles to the axis. In this way, circular disks are obtained which are polished in the circular faces to a thickness of 2 mm. Thus, round disks are obtained having a diameter of 4 mm. and a thickness of 2 mm. The stress-optic test yields the result that these disks are without stress differences. In the stress testing device, they do not exhibit interference colors. An investigation of the refractive index across the disk cross section shows that a refractive index of 1.5437 exists in the center of the disk, and this value decreases in a parabola characteristic to 1.5356 toward the edge of the disk.

This circular disk is a gradient lens suitable for optical imaging.

EXAMPLE 2

In accordance with the oxide composition 44, a blend is composed of the following raw materials, calculated, weighed, and mixed:

| | |
|---|---|
| 544.4 g. | purified sand |
| 267.5 g. | aluminum trihydrate |
| 32.1 g. | lanthanum oxide |
| 11.1 g. | zirconium oxide |
| 1.7 g. | barium nitrate |
| 6.7 g. | barium carbonate |
| 114.5 g. | lithium carbonate |
| 27.5 g. | sodium nitrate |
| 197.6 g. | sodium carbonate |
| 36.0 g. | minium |
| 35.2 g. | boric acid |
| 7.0 g. | arsenic oxide |

This mixture is charged at 1475° C. into a ceramic crucible and then heated within 10 minutes to 1452° C., left therein for 2.5 hours, then homogenized by stirring, and cooled to 1410° C. In the meantime, a ceramic nozzle has been prepared, consisting of a crucible-like upper portion which tapers funnel-like in the downward direction and terminates in a cylindrical neck having a length of 20 mm. and an inner diameter of 10 mm. The nozzle is preheated to 1320° C. and is heated electrically so that the upper portion is at a temperature of 1300° C. and the outlet at a temperature of between 700° and 1000° C. The cylindrical outlet nipple is adjusted to a viscosity of the glass of $10^3$ p. to $10^{4.5}$ p., which is, in the presently existing glass composition, 845° C. Now, the glass melted in the ceramic crucible is poured into this drawing device, runs through the nozzle, and forms below the cylindrical outlet a continuously discharged skein having a thickness of 2 mm., which cools down very rapidly to room temperature. The thus-produced glass rod is broken off at intervals of 10 cm. and introduced into a cooling furnace which is maintained at 500° C. during the experiment. After all of the rods have been introduced into the furnace, the latter is cooled to room temperature at a rate of 10° C./hour. The thusobtained homogeneous glass rods are free of stresses. They are now introduced into a salt bath of 45% by weight of sodium chloride and 5% by weight of sodium nitrite in a similar manner as in Example 1, and left therein for 27 hours. Thereafter, the rods are again cooled to room temperature outside of the bath. Respectively 5 mm. at the rod ends is sawed off, and the rod ends are then polished. A stress-optic test shows that the thus-produced gradient rods are free of stresses. The rods are distinguished by a refractive index profile which has a parabola-shaped characteristic and possesses in the center a refractive index which is higher by $\Delta n \times 10^4 = 73$ than in the external surface zone. These rods can be installed into an endoscope having a length of 9 cm. and a thickness of 2 mm. for urological examinations. They transport a distortion-free image from one end of the rod to the other.

EXAMPLE 3

For the oxide composition 46, a mixture of the following raw materials is calculated, weighed in, and mixed:

| | |
|---|---|
| 5.7025 kg. | purified sand |
| 2.0705 kg. | aluminum trihydrate |
| 0.02714 kg. | lanthanum oxide |
| 0.01149 kg. | zirconium oxide |
| 0.00172 kg. | barium nitrate |
| 0.00386 kg. | barium carbonate |
| 1.1425 kg. | lithium carbonate |
| 0.2751 kg. | sodium nitrate |
| 1.9880 kg. | sodium carbonate |
| 0.3521 kg. | minium |
| 0.8205 kg. | calcium carbonate |
| 0.0020 kg. | arsenic oxide |

The blend is charged into a platinum crucible maintained at 1450° C., heated to 1510° C., left therein for 2 hours, and then homogenized for ½ hour by agitation with a quartz agitator and cooled to 1280° C. Subsequently, the glass is poured into metal casting molds and introduced into a cooling furnace maintained at 560° C. The cooling furnace is then reduced to room temperature at a rate of 8° C./hour.

The glass blocks are sawed into glass plates having the dimensions of 40 × 40 × 2 mm. These glass plates are ground and finely polished on a large surface, resulting in substrate glasses to which are applied layers either by vaporization or by deposition from salt solutions or melts; these layers are defined by masking and cover the surface only partially, and they contain suitable ions, in this case sodium ions. By means of a subsequent temperature treatment including a diffusion process between the glass block and the layer, conducted at 654° C. over a period of 2.5 hours, zones are produced in the glass block which are changed in their composition as compared to the homogeneous starting glass. The zones are lowered with respect to their refractive index with respect to the starting glass by $\Delta n \times 10^4 = 100$; however, an observation in the optical stress testing device shows that the glass, in spite of a change in concentration in certain zones, has remained completely free of stresses. The thus-treated substrates are utilized in the field of integrated optics.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. It is to be understood that the ion exchange techniques are conventional, and that any ion exchange techniques can be employed in order to obtain products of claims 9–21 by using the techniques discussed in the literature, albeit that some routine experimentation may be required.

What is claimed is:

1. In organic vitreous material suitable for ion exchange wherein the refractive index of this material can be changed in the zone of the exchange without any significant change in the linear thermal expansion coefficient, said material consisting essentially of (in percent by weight):

| | | | |
|---|---|---|---|
| $SiO_2$ | 47 – 61 | CaO | 0 – 5 |
| $Al_2O_3$ | 13 – 20 | $Li_2O$ | 3 – 10 |
| $La_2O_3$ | 1 – 8 | $Na_2O$ | 6 – 16 |
| $Ta_2O_5$ | 0 – 7.5 | $K_2O$ | 0 – 6 |
| $ZrO_2$ | 0 – 4 | PbO | 0.5 – 15 |
| $WO_3$ | 0 – 3 | $TiO_2$ | 0 – 4 |
| BaO | 0 – 5 | $P_2O_5$ | 0 – 3 |
| ZnO | 0 – 5 | $B_2O_3$ | 0 – 5 |

-continued

| | | | |
|---|---|---|---|
| MgO | 0 – 5 | Fining Agent. | |

2. Material according to claim 1, consisting essentially of (in percent by weight):

| | | | |
|---|---|---|---|
| $SiO_2$ | 50 – 58 | CaO | 0 – 5 |
| $Al_2O_3$ | 14 – 19 | $Li_2O$ | 3.5 – 7 |
| $La_2O_3$ | 3 – 6 | $Na_2O$ | 10 – 15 |
| $Ta_2O_5$ | 1 – 2 | $K_2O$ | 0 – 2 |
| $ZrO_2$ | 0.5 – 1.5 | PbO | 2.5 – 5.5 |
| $WO_3$ | 0.5 – 2 | $TiO_2$ | 0 – 0.5 |
| BaO | 0.4 – 1.5 | $B_2O_5$ | 0 – 0.5 |
| ZnO | 0 – 0.5 | $B_2O_3$ | 0 – 0.5 |
| MgO | 0 – 1.5 | Fining Agent. | |

3. Material according to claim 1 wherein the alkali oxide ($Li_2O$ + $Na_2O$ + $K_2O$) content is at least 13.5% by weight, the ($K_2O$ + $Na_2O$) content is not below 10% by weight, and the $Li_2O$ content is not above 6.5% by weight.

4. Material according to claim 2 wherein the alkali oxide ($Li_2O$ + $Na_2O$ + $K_2O$) content is at least 13.5% by weight, the ($K_2O$ + $Na_2O$) content is not below 10% by weight, and the $Li_2O$ content is not above 6.5% by weight.

5. Material according to claim 1 wherein the weight ratio of $Al_2O_3$ to $La_2O_3$ is between 2 and 9.5.

6. Material according to claim 2 wherein the weight ratio of $Al_2O_3$ to $La_2O_3$ is between 2 and 9.5.

7. Material according to claim 1 wherein the minimum content of alkali oxide is 13.5% by weight, the ratio of ($K_2O$ + $Na_2O$) to $Li_2O$ is between 1.5 and 4.3, the minimum content of $Al_2O_3$ + $La_2O_3$ is 16% by weight, and the weight ratio of $Al_2O_3$ to $La_2O_3$ is between 4 and 6 : 1.

8. Material according to claim 2 wherein the minimum content of alkali oxide is 13.5% by weight, the ratio of ($K_2O$ + $Na_2O$) to $Li_2O$ is between 1.5 and 4.3, the minimum content of $Al_2O_3$ + $La_2O_3$ is 16% by weight, and the weight ratio of $Al_2O_3$ to $La_2O_3$ is between 4 and 6 6 : 1.

9. An ion-exchanged material produced by ion exchanging the inorganic vitreous material of claim 1, the refractive index thereof being changed in the exchange zone by at least $\Delta n_d \times 10^4 = 50$, and the linear thermal expansion coefficient between 20° and 300° C. being changed by no more than $\Delta \alpha \times 10^7 = 5$.

10. An ion-exchanged material produced by ion exchanging the inorganic vitreous material of claim 2, the refractive index thereof being changed in the exchange zone by at least $\Delta n_d \times 10^4 = 50$, and the linear thermal expansion coefficient between 20° and 300° C. being changed by no more than $\Delta \alpha \times 10^7 = 5$.

11. An ion-exchanged material produced by ion exchanging the inorganic vitreous material of claim 3, the refractive index thereof being changed in the exchange zone by at least $\Delta n_d \times 10^4 = 50$, and the linear thermal expansion coefficient between 20° and 300° C. being changed by no more than $\Delta \alpha \times 10^7 = 5$.

12. An ion-exchanged material produced by ion exchanging the inorganic vitreous material of claim 4, the refractive index thereof being changed in the exchange zone by at least $\Delta n_d \times 10^4 = 50$, and the linear thermal expansion coefficient between 20° and 300° C. being changed by no more than $\Delta \alpha \times 10^7 = 5$.

13. An ion-exchanged material produced by ion exchanging the inorganic vitreous material of claim 5, the refractive index thereof being changed in the exchange zone by at least $\Delta n_d \times 10^4 = 50$, and the linear thermal expansion coefficient between 20° and 300° C. being changed by no more than $\Delta \alpha \times 10^7 = 5$.

14. An ion-exchanged material produced by ion exchanging the inorganic vitreous material of claim 6, the refractive index thereof being changed in the exchange zone by at least $\Delta n_d \times 10^4 = 50$, and the linear thermal expansion coefficient between 20° and 300° C. being changed by no more than $\Delta \Delta \times 10^7 = 5$.

15. An ion-exchanged material produced by ion exchanging the inorganic vitreous material of claim 7, the refractive index thereof being changed in the exchange zone by at least $\Delta n_d \times 10^4 = 50$, and the linear thermal expansion coefficient between 20° and 300° C. being changed by no more than $\Delta \alpha \times 10^7 = 5$.

16. An ion-exchanged material produced by ion exchanging the inorganic vitreous material of claim 8, the refractive index thereof being changed in the exchange zone by at least $\Delta n_d \times 10^4 = 50$, and the linear thermal expansion coefficient between 20° and 300° C. being changed by no more than $\Delta \alpha \times 10^7 = 5$.

17. An ion exchanged material according to claim 9, the refractive index being changed by more than $70 \times 10^{-4}$, and the linear thermal expansion coefficient being changed in the range between 20° and 300° C. by less than $3 \times 10^{-7}/°C$.

18. An ion exchanged material according to claim 9, the ion exchanged process having been conducted with a medium containing Li, Na, K, Rb, Cs, and Tl ions.

19. An ion exchanged material according to claim 18, a salt solution being employed as the medium.

20. An ion exchanged material according to claim 18, a salt bath being employed as the medium.

21. An ion exchanged material according to claim 18, a suspension being employed as the medium.

* * * * *